(No Model.)
A. C. VAUGHAN.
NUT LOCK.
No. 449,983. Patented Apr. 7, 1891.
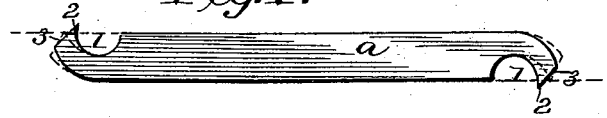
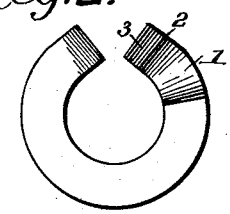
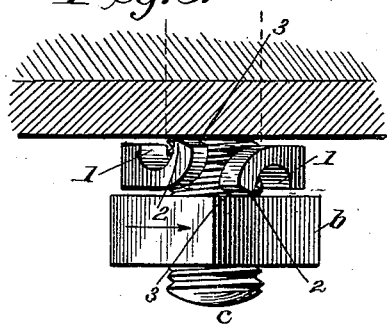
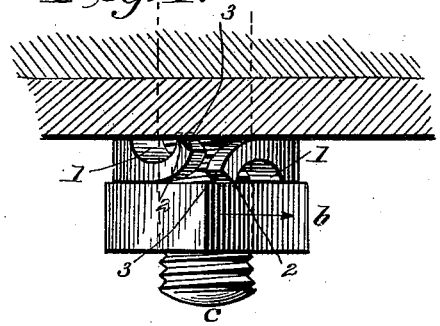
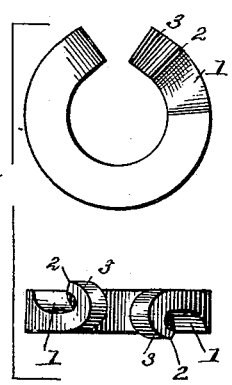
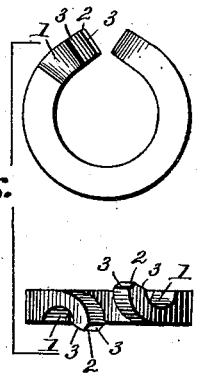
WITNESSES:
Fred G. Dieterich
Amos W. Hart
INVENTOR
A. C. Vaughan
BY Munn & Co.
ATTORNEY
THE NORRIS PETERS CO., PHOTO-LITHO., WASHINGTON, D. C.

UNITED STATES PATENT OFFICE.

AARON C. VAUGHAN, OF SHANE'S CROSSING, OHIO.

NUT-LOCK.

SPECIFICATION forming part of Letters Patent No. 449,983, dated April 7, 1891.

Application filed July 16, 1890. Serial No. 358,995. (No model.)

*To all whom it may concern:*

Be it known that I, AARON C. VAUGHAN, of Shane's Crossing, (now Rockford,) in the county of Mercer and State of Ohio, have invented a new and useful Improvement in Nut-Locks, of which the following is a specification.

My invention is an improvement in that class of spring nut-locking washers which are formed of an elastic metal bar bent into annular form and its ends diverging in opposite directions to take into the opposing surfaces of contact.

My washer is so constructed as to possess certain important advantages over others of this kind, as will appear from the following description, referring to accompanying drawings, in which—

Figure 1 is a side view of the bar, which is bent into annular shape to form the complete washer. Fig. 2 is a plan view of the washer. Fig. 3 is mainly a side view showing a nut screwed on a bolt and in contact with the angular or "biting-points" of the washer. Fig. 4 is a like view showing the nut screwed "home," so that the biting-points are depressed or forced inward parallel to the plane of the adjacent surfaces of the body of the washer. Figs. 5 and 6 show modifications of the washer.

I will first describe the washer shown in Figs. 1, 2, 3, and 4. It is constructed of an elastic metal bar $a$, (see Fig. 1,) of proper length. For this purpose I preferably employ a steel bar whose body is rectangular in cross-section. It is preferably cut from a plate at one operation, and is thus economically manufactured. The end portions of said bar are curved, one upward and the other downward, and contiguous to the ends on the inner side of the curve there is a semicircular cavity or recess. It will be seen that the angular points 2 of the curved ends project slightly above and below the plane of the body $a$ of the bar and the originally-squared ends of the bar being inclined to its axis and constituting bevels 3, that serve as bearing-surfaces when the nut $b$ is being turned off, as will be presently explained. The bar $a$ is bent into annular shape, Fig. 2, its curved ends being, however, separated by a narrow space, in which form the washer is complete and ready for use. It will be noted that the extremities of the reduced and curved end portions of the washer are in effect springs, and that consequently when a nut $b$ is being screwed on the bolt $c$ it will obviously come first in contact with one of the annular points 2, as shown in Fig. 3; but when turned home the points 2 will be depressed or forced inward, as shown by dotted lines, Fig. 1, and the nut $b$ rests, as in Fig. 4, flat on the body $a$ of the washer, which then mainly sustains the crushing effect of leverage of the screw. Thus while the beveled surfaces 3 allow the nut $b$ to readily pass over them when being turned down they oppose the return or reverse movement of the same by engaging with or biting into the under surface of the nut, as will be readily understood.

In the modification shown in Fig. 6 the ends of the washer are more reduced and curved farther inward, so that the extremity 3 of the curved outer side takes the place of the bevel 3, before described.

In practice I may construct one end of the washer as shown in Figs. 1 to 4 and the other as shown in Fig. 6.

In the modification shown in Fig. 6 the extremity of the washer has two inclines 3, and is thus practically double-beveled. In this case the nut bears on the inner bevel 3 when being turned down, and the spring end of the washer is bent farther outward, and in turning the nut off, the angle 2 of the two bevels 3 bites into the nut and opposes the reverse movement.

In use of any of these forms of washer, when the nut is being turned on or off there is a slight torsion or twist, which throws the angular points into greater obliquity to the nut and augments the bite or holding capacity of the washer.

What I claim is—

1. A nut-locking washer consisting of an elastic metal bar bent into annular form and having its end portions provided with recesses and beveled and projecting normally above the plane of the body of the washer, as shown and described.

2. The annular nut-locking washer having its end portions provided with a recess and extending, respectively, above and below the plane of the body of the washer and beveled outwardly from said recess, as shown and described.

AARON C. VAUGHAN.

Witnesses:
J. A. BALTZELL,
ISAAC WISTERMAN.